US012563416B2

(12) United States Patent
Desai et al.

(10) Patent No.: US 12,563,416 B2
(45) Date of Patent: Feb. 24, 2026

(54) METHOD AND APPARATUS FOR AUTOMATICALLY APPLYING CONFIGURATION RECOMMENDATIONS IN A WIRELESS NETWORK

(71) Applicant: Cisco Technology, Inc., San Jose, CA (US)

(72) Inventors: Vishal S Desai, San Jose, CA (US); Young Il Choi, San Jose, CA (US); Abhishek Datta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 18/310,698

(22) Filed: May 2, 2023

(65) Prior Publication Data

US 2024/0373234 A1 Nov. 7, 2024

(51) Int. Cl.
*H04W 24/02* (2009.01)
*H04L 41/08* (2022.01)
(Continued)

(52) U.S. Cl.
CPC ......... *H04W 24/02* (2013.01); *H04L 41/0816* (2013.01); *H04L 41/0883* (2013.01);
(Continued)

(58) Field of Classification Search
CPC .......... H04W 24/00–10; H04L 41/0813–0836; H04L 41/0876–0886; H04L 41/0893; H04L 41/0894
See application file for complete search history.

(56) References Cited

U.S. PATENT DOCUMENTS 12,368,640 B2 * 7/2025 Ramanathan ....... H04L 41/0836
2005/0153702 A1 7/2005 Cuffaro et al.
(Continued)

FOREIGN PATENT DOCUMENTS

WO 2016000165 1/2016
WO WO-2023078523 A1 * 5/2023 ........ H04W 52/0209

OTHER PUBLICATIONS

ETSI. ETSI TS 132 500: Universal Mobile Telcommunications Systems (UTMS); LTE; Telecommunication Management; Self-Organizing Networks (SON); Concepts and Requirements. Version 16.0.0, Aug. 2020 (Year: 2020).*
(Continued)

*Primary Examiner* — Brendan Y Higa
(74) *Attorney, Agent, or Firm* — Polsinelli P.C.

(57) ABSTRACT

A system and method are provided for automatically applying configuration recommendations to a wireless network. Configuration recommendations are received from an artificial intelligence (AI) radio resource management (RRM) recommendation engine, and an auto-pilot functionality automatically applies some (or all) of the recommendations to the network, reducing the network administrator's workload. The wireless network receives user inputs for timing, RF frequencies, zones (e.g., building and RF groups therein), risk tolerances, etc. that control configuration policies for how the configuration recommendations are automatically applied to the wireless network. User inputs can be received through a GUI that organizes the types of configuration recommendations into sets (or categories) and associates these sets with respective conditions controlling if/when the respective sets are automatically applied to the network. In addition to facilitating user inputs, the GUI also provides user feedback by reporting on the configuration
(Continued)

recommendations received and implemented by the auto pilot.

20 Claims, 9 Drawing Sheets

(51) Int. Cl.
| | | |
|---|---|---|
| *H04L 41/0816* | (2022.01) | |
| *H04L 41/22* | (2022.01) | |
| *H04W 16/10* | (2009.01) | |

(52) U.S. Cl.
CPC ......... *H04L 41/0886* (2013.01); *H04W 16/10* (2013.01); *H04L 41/22* (2013.01)

(56) References Cited

U.S. PATENT DOCUMENTS

| | | | |
|---|---|---|---|
| 2011/0028144 | A1 | 2/2011 | Catovic et al. |
| 2016/0021571 | A1* | 1/2016 | Bansal ............... H04L 41/0894 |
| | | | 370/236 |
| 2017/0034023 | A1 | 2/2017 | Nickolov et al. |
| 2017/0180981 | A1 | 6/2017 | Lin et al. |
| 2019/0246293 | A1* | 8/2019 | Halabian ............... H04W 80/02 |
| 2019/0320332 | A1 | 10/2019 | Halabian et al. |
| 2023/0047635 | A1 | 2/2023 | Friday et al. |
| 2023/0080610 | A1* | 3/2023 | Zohoorian ............ H04W 16/18 |
| | | | 370/329 |
| 2023/0209374 | A1* | 6/2023 | Saluja ................. H04L 41/0661 |
| | | | 370/216 |
| 2023/0328547 | A1* | 10/2023 | Agerstam ............ H04W 24/02 |
| | | | 370/252 |
| 2024/0039786 | A1* | 2/2024 | Ramanathan ....... H04L 41/0836 |

OTHER PUBLICATIONS

International Search Report and Written Opinion for International Application No. PCT/US2024/026014, mailed Aug. 2, 2024, 13 Pages.

* cited by examiner

GUI 402

Assign Locations to AI RF-Profile: RRM_RF_PROFILE

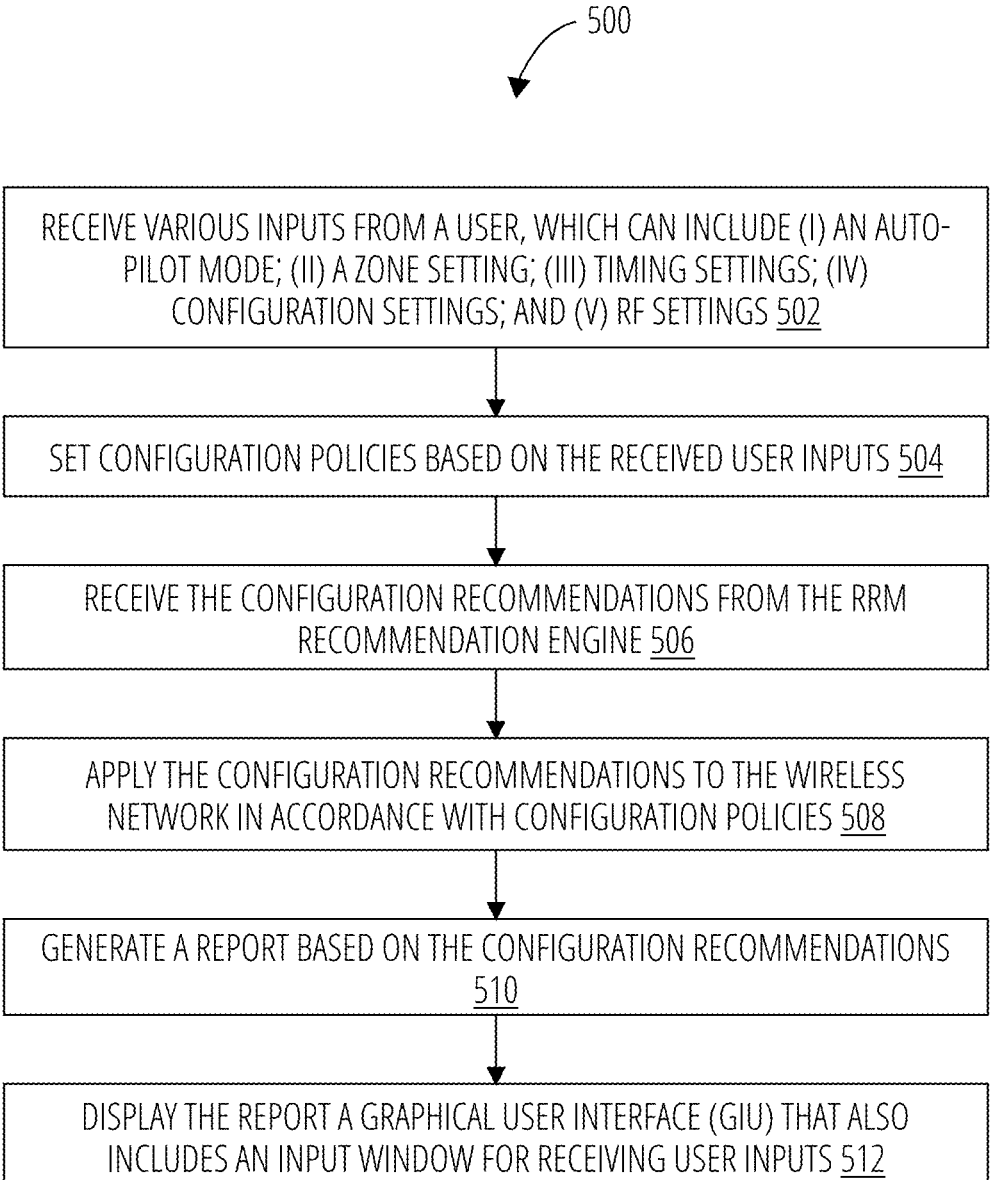

RECEIVE VARIOUS INPUTS FROM A USER, WHICH CAN INCLUDE (I) AN AUTO-PILOT MODE; (II) A ZONE SETTING; (III) TIMING SETTINGS; (IV) CONFIGURATION SETTINGS; AND (V) RF SETTINGS 502

SET CONFIGURATION POLICIES BASED ON THE RECEIVED USER INPUTS 504

RECEIVE THE CONFIGURATION RECOMMENDATIONS FROM THE RRM RECOMMENDATION ENGINE 506

APPLY THE CONFIGURATION RECOMMENDATIONS TO THE WIRELESS NETWORK IN ACCORDANCE WITH CONFIGURATION POLICIES 508

GENERATE A REPORT BASED ON THE CONFIGURATION RECOMMENDATIONS 510

DISPLAY THE REPORT A GRAPHICAL USER INTERFACE (GIU) THAT ALSO INCLUDES AN INPUT WINDOW FOR RECEIVING USER INPUTS 512

FIG. 5

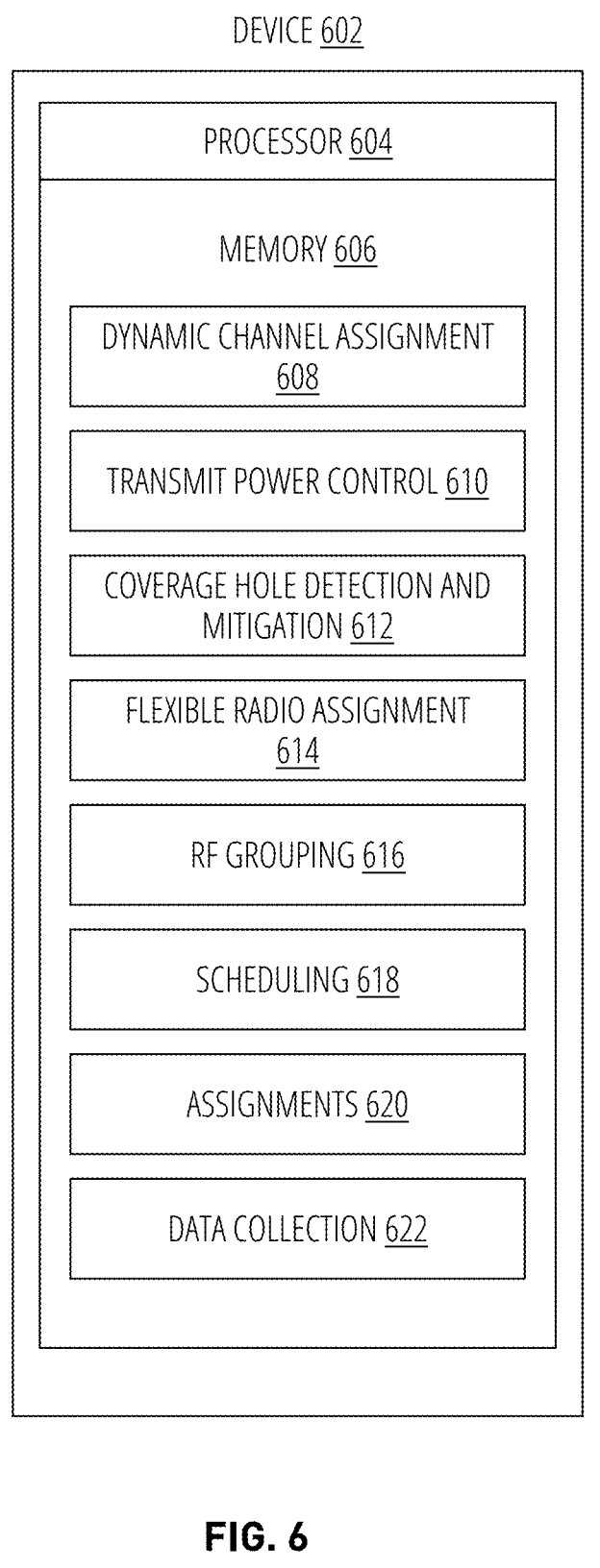

DEVICE 602

PROCESSOR 604

MEMORY 606

DYNAMIC CHANNEL ASSIGNMENT
608

TRANSMIT POWER CONTROL 610

COVERAGE HOLE DETECTION AND
MITIGATION 612

FLEXIBLE RADIO ASSIGNMENT
614

RF GROUPING 616

SCHEDULING 618

ASSIGNMENTS 620

DATA COLLECTION 622

FIG. 6

METHOD AND APPARATUS FOR AUTOMATICALLY APPLYING CONFIGURATION RECOMMENDATIONS IN A WIRELESS NETWORK

BACKGROUND

Wireless connectivity is quickly becoming ubiquitous in the modern world, and Wi-Fi is responsible for a significant part of this increase in wireless connectivity. Wi-Fi is one of the fastest growing wireless technologies of all time. With the proliferation of wireless devices and the growth of the internet of things (IoT), there is increasing demand for more bandwidth and wireless rescores. Wireless spectrum is becoming even more precious than before, and the pressure on available spectrum seems likely to increase over time. Because wireless spectrum is a limited commodity, there is increasing pressure to use the wireless spectrum efficiently.

As the number of networked devices transmitting signals on various frequencies continually increases, the likelihood of radio interference between the various devices also increases. Furthermore, many electronic devices that are not connected to networks can cause enough radio interference that the network connection between networked devices is disrupted. Many modern networked communication networks and devices detect the radio interference and begin processes to decrease the effects of the interference, such as changing the channel or radio frequencies used by the connected networked device.

Radio resource management (RRM) provides tools to better manage a wireless network. When two cells associated with access points (APs) of a wireless network overlap one another on the same channel, they share the spectrum normally reserved for each. In addition to the fact that users of each cell share the single channel of available spectrum, the spectrum is further constrained due to the doubling of the management traffic on the spectrum. This co-channel interference results in higher consumption of air time and less throughput. RRM attempts to improve the network performance by adjusting the channel plan to facilitate the maximum separation of one access point (AP) from another, and by adjusting the power levels transmitted by the APs to optimize the size of their effective cells to provide adequate coverage while minimizing conflicting overlaps. The RRM analyzes the existing RF environment, and adjusts each APs' power and channel configurations to help mitigate such things as co-channel interference and signal coverage problems. RRM reduces the need to perform exhaustive site surveys, increases system capacity and provides automated self-healing functionality to compensate for RF dead zones and AP failures.

Even when a network administrator receives helpful configuration recommendations to optimize the performance of the wireless network, the task of manually applying these configuration recommendations can be timing consuming. Further, the best time for implementing the configuration recommendations in order to avoid network downtime can be inconvenient for the network administrators. Accordingly, better tools are desired to help automate the process of applying configuration recommendations to the wireless network.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates a flow diagram for an example of a method 500, in accordance with some embodiments.

FIG. 6 illustrates a block diagram of a device performing RRM computations, in accordance with some embodiments.

DESCRIPTION OF EXAMPLE EMBODIMENTS

Figure 1:
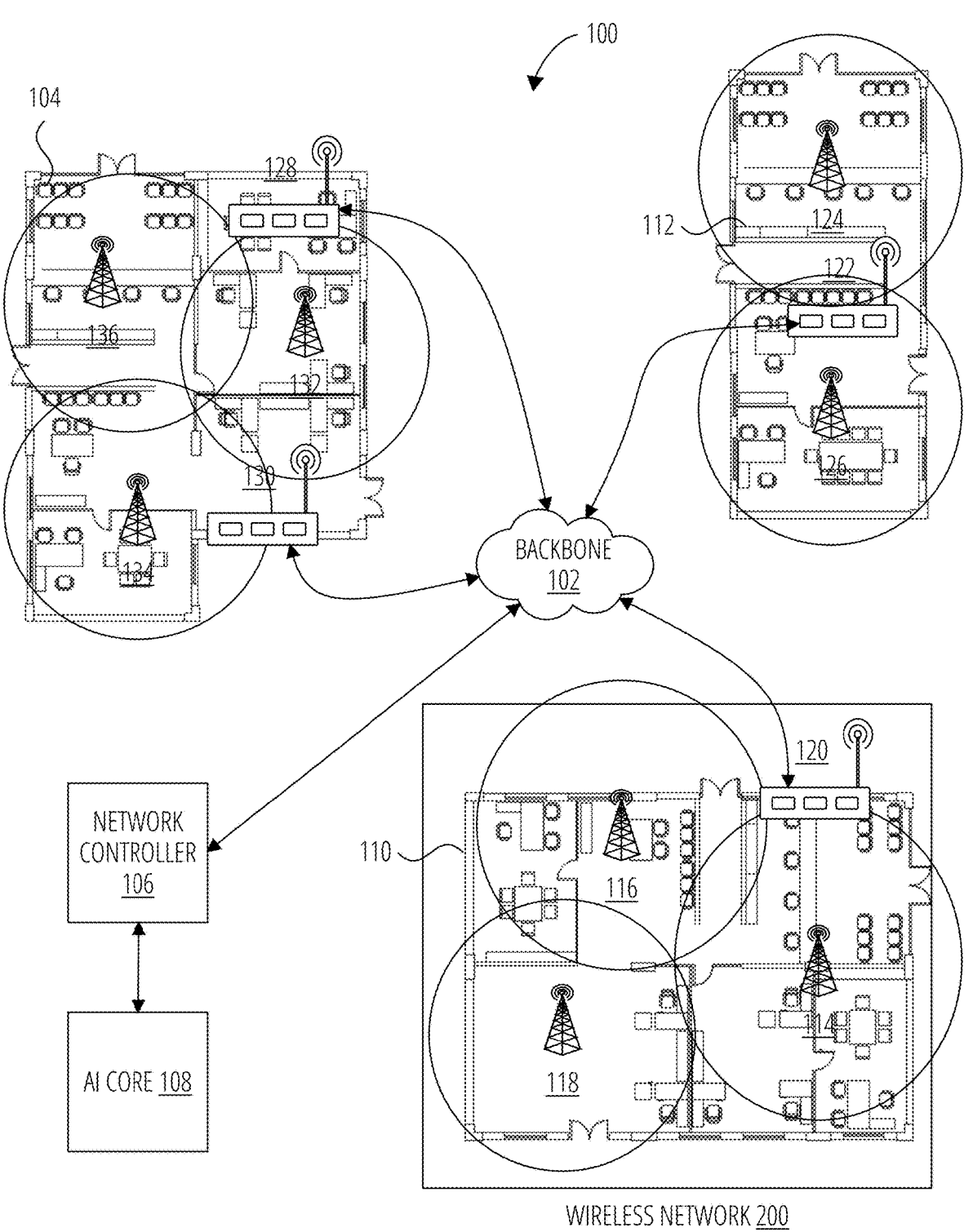
FIG. 1 illustrates a schematic diagram for an example of a system network, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The AI Core when combined with the auto pilot functionality disclosed herein provides for radio resource management (RRM) within a wireless network that continuously analyzes the existing RF environment, automatically adjusting APs' power levels and channel configurations to help mitigate such things as co-channel interference and signal coverage problems. RRM reduces the need to perform exhaustive site surveys, increases system capacity, and provides automated self-healing functionality to compensate for RF dead zones and AP failures.

Overview

In one aspect, a method of applying configuration recommendations to a wireless network. The method includes receiving a first-user input selecting between an auto-pilot mode and a manual mode. The auto-pilot mode indicate that configuration recommendations received from radio resource management (RRM) recommendation engine are to be applied automatically to a wireless network. The manual mode indicate that the configuration recommendations received from the RRM recommendation engine are to be applied to the wireless network in response to a user manually applying the configuration recommendations to the wireless network The method includes setting configuration policies based on the received first-user input. The configuration policies include indications whether one or more of the configuration recommendations will be applied automatically to the wireless network applied. The configuration policies include timing information representing one or more times during which the one or more configuration recommendations will be applied automatically to the wireless network The method includes receiving the configuration recommendations from the RRM recommendation engine. The method includes applying the configuration recommendations to the wireless network in accordance with the configuration policies, such that, when the auto-pilot mode is selected, the one or more of the configuration recommendations are applied automatically to the wireless network during the one or more times set in the configuration policies.

In another aspect, the method may also include further includes receiving a second-user input selectively indicating in which zones of the wireless network the one or more configuration recommendations are to be automatically applied.

In another aspect, the method may also include that the second-user input includes a setting that, in a first zone of the zones, delays automatically applying a first set of the configuration recommendations until an off-hours period, which is set in the timing information, where the first set of the configuration recommendations are marked as corresponding to a risk of a disruption to wireless service.

In another aspect, the method may also include that the second-user input includes a setting that, in a first zone of the zones, delays automatically applying a first set of the configuration recommendations until a number of clients using the wireless service in the first zone is less than a predefined client-number threshold.

In another aspect, the method may also include that the zones comprise respective buildings within a campus of buildings, one or more floors within the respective buildings, or spaces within the respective building sharing a common functional purpose.

In another aspect, the method may also include that the zones are the spaces sharing the common functional purpose, the spaces are conference-room spaces, office spaces, or auditorium spaces.

In another aspect, the method may also include receiving a second-user input indicating a busy-hours period, where the wireless network serves more clients on average during the busy-hours period than during an off-hours period, and the off-hours period is a time window that excludes the busy-hours period, receiving a third user input selecting a first set and a second set of the configuration recommendations, where the first set of the configuration recommendations are RRM recommendations that when applied to the wireless network correspond to negligible risk of disrupting wireless service, and the second set of the configuration recommendations are RRM recommendations that upon being applied require a radio reset, applying the first set of the configuration recommendations during either the busy-hours period or during the off-hours period, and applying the second set of the configuration recommendations only during the off-hours period.

In one aspect, the method of claim 1, where receiving a second-user input indicating a tolerance for disruptions to the wireless network, receiving a network-health measure representing a degree to which performance of the wireless network has degraded, when the second-user input indicates a first tolerance for the disruptions, automatically applying the one or more configuration recommendations to the wireless network upon the network-health measure being less than a first predefined health threshold, when the second-user input indicates a second tolerance—which is lower than the first tolerance—for the disruptions, automatically applying the one or more configuration recommendations to the wireless network upon the network-health measure being less than a second predefined health threshold, where the second predefined health threshold is less than the first predefined health threshold, and when the network-health measure remains greater than the first predefined health threshold, waiting until an off-hours period to automatically apply the one or more configuration recommendations to the wireless network.

In another aspect, the method may also include receiving second-user inputs selecting radio frequencies (RF) settings for the wireless network, the RF settings being associated with the one or more configuration recommendations that are automatically applied, setting the configuration policies based on the received second-user input, and applying the configuration recommendations to the wireless network in accordance with configuration policies, such that, when the auto-pilot mode is selected, the one or more of the configuration recommendations are applied automatically using the RF settings.

In another aspect, the method may also include generating a report based on the configuration recommendations, the report summarizing the configuration recommendations received from the RRM recommendation engine and the one or more configuration recommendations that have been automatically applied to the wireless network over a predefined time window, and the report including a summary of benefits to the wireless network predicted for applying the configuration recommendations, and benefits realized from the one or more configuration recommendations that have been automatically applied to the wireless network.

In another aspect, the method may also include controlling a display to display a graphical user interface (GIU), the GUI including an input portion into which a user inputs the first-user inputs, and the GUI including a reporting portion in which a report is displayed showing a difference in performance of the wireless network with the configuration recommendations relative to a performance of the wireless network without the configuration recommendations.

In another aspect, the method may also include that the GUI further includes a reporting portion in which a report is displayed showing a difference in performance of the wireless network with the configuration recommendations relative to a performance of the wireless network without the configuration recommendations.

In another aspect, the method may also include that the reporting portion of the GUI further displays a report that summarizes the configuration recommendations and that describes benefits to the wireless network arising from the configuration recommendations applied to the wireless network over a predefined period.

In one aspect, a computing apparatus includes a processor. The computing apparatus also includes a memory storing instructions that, when executed by the processor, configure the apparatus to perform the respective steps of any one of the aspects of the above recited methods.

In one aspect, a computing apparatus includes a processor. The computing apparatus also includes a memory storing instructions that, when executed by the processor, configure the apparatus to receive a first-user input selecting between an auto-pilot mode and a manual mode, the auto-pilot mode indicating that configuration recommendations received from radio resource management (RRM) recommendation engine are to be applied automatically to a wireless network, and the manual mode indicating that the configuration recommendations received from the RRM recommendation engine are to be applied to the wireless network in response to a user manually applying the configuration recommendations to the wireless network, set configuration policies based on the received first-user input, the configuration policies including indications whether one or more of the configuration recommendations will be applied automatically to the wireless network applied, and the configuration policies including timing information representing one or more times during which the one or more configuration recommendations will be applied automatically to the wireless network, receive the configuration recommendations from the RRM recommendation engine, and apply the configuration recommendations to the wireless network in accordance with the configuration policies, such that, when the auto-pilot mode is selected, the one or more of the configuration recommendations are applied automatically to the wireless network during the one or more times set in the configuration policies.

In another aspect, when executed by the processor, the instructions stored in the memory cause the processor to receive a second-user input selectively indicating in which zones of the wireless network the one or more configuration recommendations are to be automatically applied, and delay, in a first zone indicated by the second-user input, automatically applying a first set of the configuration recommendations until an off-hours period, which is set in the timing information, where the first set of the configuration recommendations are marked as corresponding to a risk of disrupting service within the wireless network, and the zones comprise respective buildings within a campus of buildings, one or more floors within the respective buildings, or spaces within the respective building sharing a common functional purpose.

In another aspect, when executed by the processor, the instructions stored in the memory cause the processor to receive a second-user input indicating a busy-hours period, where the wireless network serves more clients on average during the busy-hours period than during an off-hours period, and the off-hours period is a time window that excludes the busy-hours period, receive a third user input selecting a first set and a second set of the configuration recommendations, where the first set of the configuration recommendations are RRM recommendations that when applied to the wireless network correspond to negligible risk of disrupting wireless service, and the second set of the configuration recommendations are RRM recommendations that upon being applied require a radio reset, apply the first set of the configuration recommendations during either the busy-hours period or during the off-hours period, and apply the second set of the configuration recommendations only during the off-hours period.

In another aspect, when executed by the processor, the instructions stored in the memory cause the processor to receive a second-user input indicating a tolerance for disruptions to the wireless network, receive a network-health measure representing a degree to which performance of the wireless network has degraded, when the second-user input indicates a first tolerance for the disruptions, automatically apply the one or more configuration recommendations to the wireless network upon the network-health measure being less than a first predefined health threshold, when the second-user input indicates a second tolerance—which is lower than the first tolerance—for the disruptions, automatically apply the one or more configuration recommendations to the wireless network upon the network-health measure being less than a second predefined health threshold, where the second predefined health threshold is less than the first predefined health threshold, and when the network-health measure remains greater than the first predefined health threshold, wait until an off-hours period to automatically apply the one or more configuration recommendations to the wireless network.

In another aspect, when executed by the processor, the instructions stored in the memory cause the processor to receive second-user inputs selecting radio frequencies (RF) settings for the wireless network, the RF settings being associated with the one or more configuration recommendations that are automatically applied, set the configuration policies based on the received second-user input, and apply the configuration recommendations to the wireless network in accordance with configuration policies, such that, when the auto-pilot mode is selected, the one or more of the configuration recommendations are applied automatically using the RF settings.

In another aspect, when executed by the processor, the instructions stored in the memory cause the processor to control a display to display a graphical user interface (GIU), the GUI including an input portion into which a user inputs the first-user inputs, and the GUI including a reporting portion in which a report is displayed showing a difference in performance of the wireless network with the configuration recommendations relative to a performance of the wireless network without the configuration recommendations.

In one aspect, a non-transitory computer-readable storage medium, the computer-readable storage medium including instructions that when executed by a computer, cause the computer to perform the respective steps of any one of the aspects of the above recited methods.

In one aspect, a non-transitory computer-readable storage medium, the computer-readable storage medium including instructions that when executed by a computer, cause the computer to receive a first-user input selecting between an auto-pilot mode and a manual mode, the auto-pilot mode indicating that configuration recommendations received from radio resource management (RRM) recommendation engine are to be applied automatically to a wireless network, and the manual mode indicating that the configuration recommendations received from the RRM recommendation engine are to be applied to the wireless network in response to a user manually applying the configuration recommendations to the wireless network, set configuration policies based on the received first-user input, the configuration policies including indications whether one or more of the configuration recommendations will be applied automatically to the wireless network applied, and the configuration policies including timing information representing one or more times during which the one or more configuration recommendations will be applied automatically to the wireless network, receive the configuration recommendations from the RRM recommendation engine, and apply the configuration recommendations to the wireless network in accordance with the configuration policies, such that, when the auto-pilot mode is selected, the one or more of the configuration recommendations are applied automatically to the wireless network during the one or more times set in the configuration policies.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for reducing the burden on network administrators to update the configuration of a wireless network by using an auto pilot to automate some (or all) of the tuning of RRM parameters. This can have the additional benefits of using artificial intelligence (AI) operations to optimize network tuning and thereby reducing operations costs for the end customers. The auto pilot also can have the benefits of: (i) supporting wireless configurations for 2.4 GHZ, 5 GHZ and 6 GHz spectrums; (ii) applying AI-generated configuration recommendations during the off-hours of the building to avoid disruptions to wireless service during busy hours; (iii) mitigating network downtime during which lack of wireless service impacts work performance; and (iv) casing user control by providing an intuitive, user-friendly interface in which configuration policies are controlled by users under an AI-RF profile (e.g., CISCO DNA CENTER).

Further, the system equipped with auto pilot can reduce barriers to entry for non-RF savvy customers by providing them with expert radio tuning. For example, the AI Core 108 discussed below can provide configuration recommendations for tuning the wireless configurations based on the unique building characteristics. But these expertly devised configuration recommendations are of no utility until they have actually been applied to the system. In the absence of an auto pilot, the AI Core 108 would make the configuration recommendations, but application of these configuration recommendations to the wireless network would only occur after a network administrator acted on the configuration recommendations by manual applying the recommended changes to the wireless network. If the network administrator failed to do so, then the wireless network would continue in the unoptimized configuration.

There may be many reasons why the network administrator might fail to manually apply the recommended changes to the network configuration. For example, some changes might be better applied during off hours, when the network administrator is not available to manually apply the recommended changes. Further, the network administrator may incorrectly assume that the recommended changes only provide a marginal improvement in performance. Moreover, the network administrator may be overwhelmed with more pressing problems. Additionally, it may not be cost effective for the network administrator to constantly monitor notifications from the AI Core 108 for the configuration recommendations and manually apply them because that may be a time-consuming task.

The methods and apparatuses described herein overcome these challenges by providing an auto pilot functionality that associates respective types of configuration recommendations with certain conditions for when and how the respective types of configuration recommendations will automatically be applied to the wireless network. For example, a first set of the of configuration recommendations can be a type that are seamless applied to the wireless network at any time, regardless of whether it is during busy hours or is during off hours. A second set of the of configuration recommendations can be a type that requires a radio reset when they are applied. Accordingly, the auto pilot can wait until off-hours before automatically applying the second set of the of configuration recommendations to the wireless network.

A further condition set in the auto pilot might, however, may be used to apply the second set of the of configuration recommendations even during busy hours, if the performance of the wireless network becomes so degraded that a temporary disruption resulting from a radio reset to wireless service is more favorable than continuing with the degraded performance. In this case, network-health measure may be used to monitor the performance of the network to determine when the performance has degraded below a minimum threshold.

As can be seen in the above examples, there can be many different conditions that control when, how, and in what zones (e.g., RF groups) the auto pilot functionality automatically applies the configuration recommendations to the wireless network. These conditions can be set in configuration policies of the system network, and these conditions can be dictated by user inputs. For example, the user inputs can be entered using a graphical user interface (GUI), as discussed below.

Further, according to certain non-limiting examples, the methods and systems disclosed herein provide for radio resource management (RRM) within a local network that continuously analyzes the existing RF environment and automatically adjusts access points' (APs') power levels and channel configurations to help mitigate, inter alia, co-channel interference and signal coverage problems. RRM reduces the need to perform exhaustive site surveys, increases system capacity, and provides automated self-healing functionality to compensate for RF dead zones and AP failures.

Implementing the "auto-pilot" mode enables the RRM to automatically continuously analyze and reconfigure the RRM. The combination of RRM (or AI-RRM) together with the auto-pilot configuration allows a network administrator to be hands-off and let AI-Enhanced RRM to both make configuration recommendations and apply said recommendations to the network, while the network administrator monitors the overall operation.

In addition to updating of the radio configurations, the AI Core can generate AI-RF Profile configuration recommendations to ensure that a network administrator does not have to figure out complex conditions and thresholds that would depend on RF savvy and expertise.

According to certain non-limiting examples, the RRM auto pilot includes a method that automatically updates recommendations based on either brute force (apply all) or more sophisticated version that leverages historical insights. The method can include multiple steps. For example, in a first step, the RRM auto pilot can compute the probability of the network administrator applying configuration recommendations in the wireless network. In a second step, the RRM auto pilot can classify the profile configurations in to multiple categories. The multiple categories can include: (i) User Policies; (ii) Busy Hours; (iii) Tolerance for Config Updates; (iv) Core Services; (v) RRM processes/algorithms (e.g., DCA, TPC, CHDM, FRA, DBS, etc.); (iv) Advance Configurations; (vii) Frequency Distribution; (viii) Data Rate Optimization; (xi) Power Control Thresholds; (x) Client Connectivity and Roaming Config; (xi) Capacity Improvements; and (xii) Contention Reduction. The AI- Enhanced RRM together with the auto pilot functionality can be integrated with the CISCO DNA CENTER, as discussed below.

According to certain non-limiting examples, the system and method disclosed herein provide control settings for automatically applying configuration recommendations to a wireless network. Configuration recommendations are received from an artificial intelligence (AI) RRM recommendation engine, and an auto-pilot functionality automatically applies some (or all) of the recommendations to the network, reducing the network administrator's workload. The network receives user inputs for timing, RF frequencies, zones (e.g., building and RF groups therein), risk tolerances, etc. that control configuration policies for how the configuration recommendations are automatically applied to the wireless network. User inputs can be received through a GUI that organizes the types of configuration recommendations into sets (or categories) and associates these sets with respective conditions controlling if/when the respective sets are automatically applied. In addition to facilitating user inputs, the GUI also provides user feedback by reporting on the configuration recommendations received and implemented by the auto pilot.

FIG. 1 illustrates an example of a system network 100 that includes three buildings (i.e., building A 104, building B 110, and building C 112). In this nonlimiting example, the building A 104 includes two wireless LAN controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a CAPWAP tunnel.

The settings of the WLCs can be controlled by a network controller 106, which communicates with the WLCs via the backbone 102. For example, the network controller 106 can be a CISCO DNA CENTER, which is a centralized intent-based network management system. The network controller 106 can be based in the cloud, for example. Further an artificial intelligence (AI) core 108 communicates signal to and from the network controller 106. The AI Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The AI Core 108 may be, for example, a cloud based application that learns from the wireless network 200 and from additional wireless networks how best to optimize the network configurations based on data and measured values from the respective networks. The configuration recommendations are then sent from the AI Core 108 to the network controller 106.

The AI Core 108 when combined with the auto pilot functionality disclosed herein provides for a RRM within a local network that continuously analyzes the existing RF environment, automatically adjusting APs' power levels and channel configurations to help mitigate such things as co-channel interference and signal coverage problems. RRM reduces the need to perform exhaustive site surveys, increases system capacity, and provides automated self-healing functionality to compensate for RF dead zones and AP failures.

The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 114 and user equipment 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications by the network administrator (or other uses).

The wireless LAN controller 120 can communicate with a wide area network (WAN) 206 to allow the user devices to access the internet, for example. The wireless network 200 can be a WiFi network operating in accordance with an IEEE 802.11 protocol.

The AI Core 108 can be used to perform radio resource management (RRM). RRM) allows the wireless network 200 to continuously analyze the existing RF environment, and based on this analysis automatically adjust each APs' power and channel configurations to help mitigate such things as co-channel interference and signal coverage problems. RRM can reduce the need to perform exhaustive site surveys, and RRM can increase system capacity and provides automated self-healing functionality to compensate for RF dead zones and AP failures.

Figure 3:
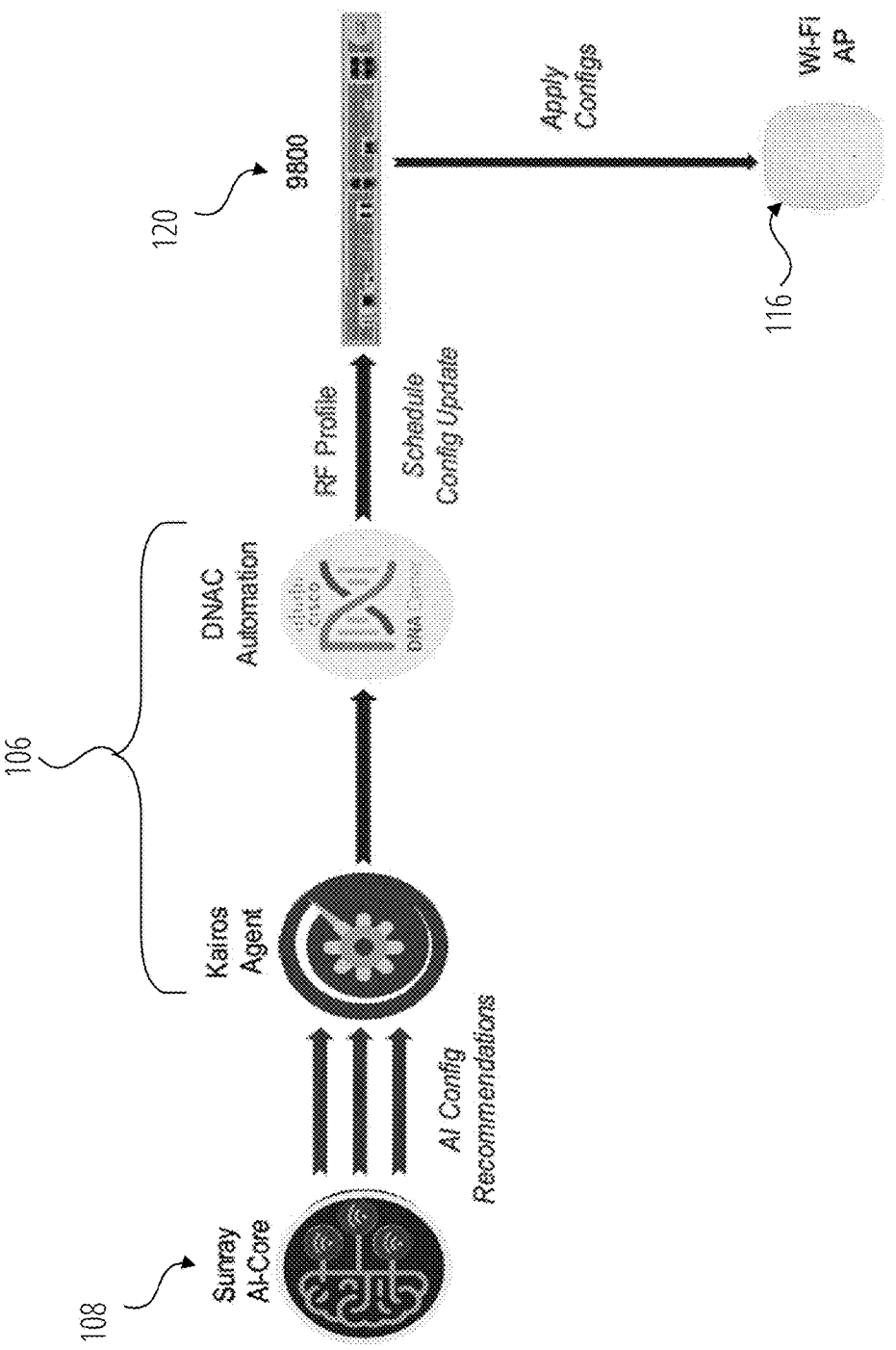
FIG. 3 illustrates a schematic diagram for another example of a system network, in accordance with some embodiments

FIG. 3 illustrates a non-limiting example of a system network 100 having a network controller 106, an AI Core 108, an AP1 116, and a wireless LAN controller 120. Here, the AI Core 108 is a SUNRAY AI-Core that provides AI configuration recommendations to a KAIROS AGENT, which is part of the network controller 106. The network controller 106 includes the KAIROS AGENT and a CISCO DNA CENTER. The CISCO DNA CENTER provides radio frequency (RF) profiles and provides a schedule for when to perform configuration updates to the wireless LAN controller 120, which in this example is illustrated using a CISCO catalyst 9800 series wireless controller. The wireless LAN controller 120 then applies the configurations to the AP1 116 in accordance with the scheduled received from the CISCO DNA CENTER. The CISCO DNA CENTER is management system that leverages AI to connect, secure, and automate network operations.

FIGS. 4A-4E illustrate a non-limiting example of a graphical user interface (GUI) 402 that provides user access to control and view various setting for the auto pilot. Further, the GUI 402 can provide a reporting window 420 for users to view reports regarding what configuration changes have been made to the system network 100 and the impact of said changes. The GUI 402 includes an auto-pilot control 404, a control for RF settings 406, a control for timing settings 408, a control for tolerance settings 410, a control for zone settings 414, a control for region settings 416, a help window 418, a window for RRM selections 412, and a reporting window 420. The reporting window 420 can include a count summary 422, a coverage summary 424, an RF summary 426, a change summary 428, plots 430, and a text notifications 432. Not all of the above-noted features/functionalities (e.g., the afore-mentioned controls and windows) are necessarily displayed in the GUI 402 simultaneously. For example, the GUI can have various pull-down menus and tabs that enable a user to efficiently and intuitively navigate and access the above-noted features/functionalities.

Figure 4A:
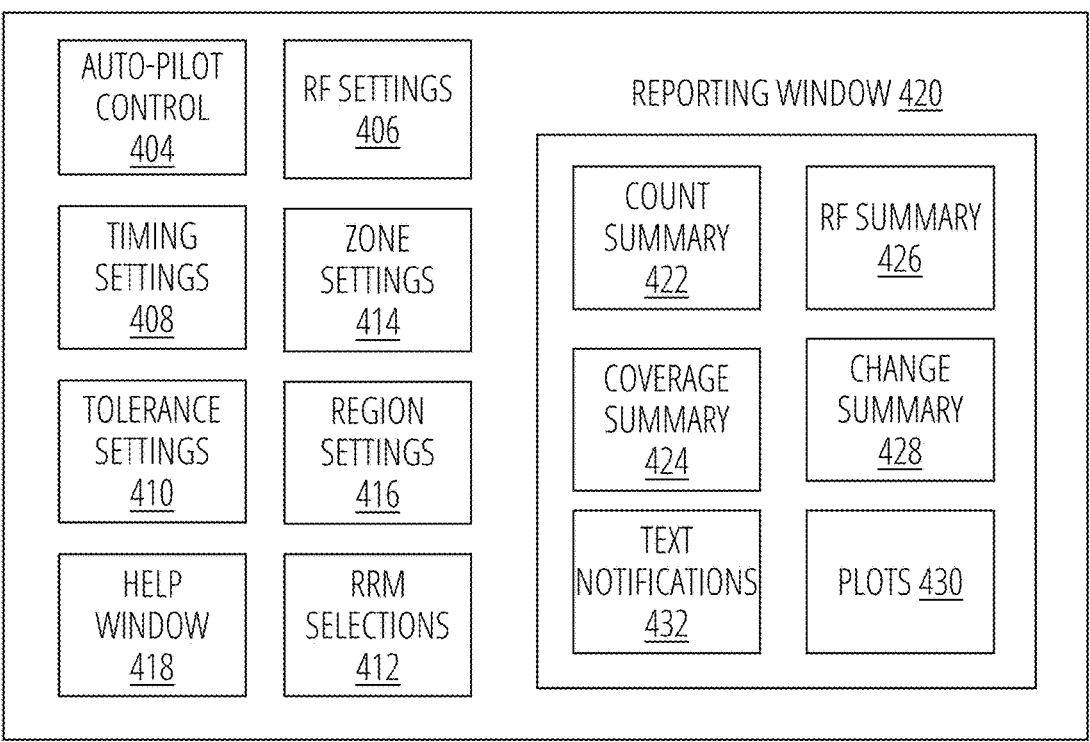
FIG. 4A illustrates a block diagram of a graphical user interface (GUI), in accordance with some embodiments.
Figure 4B:
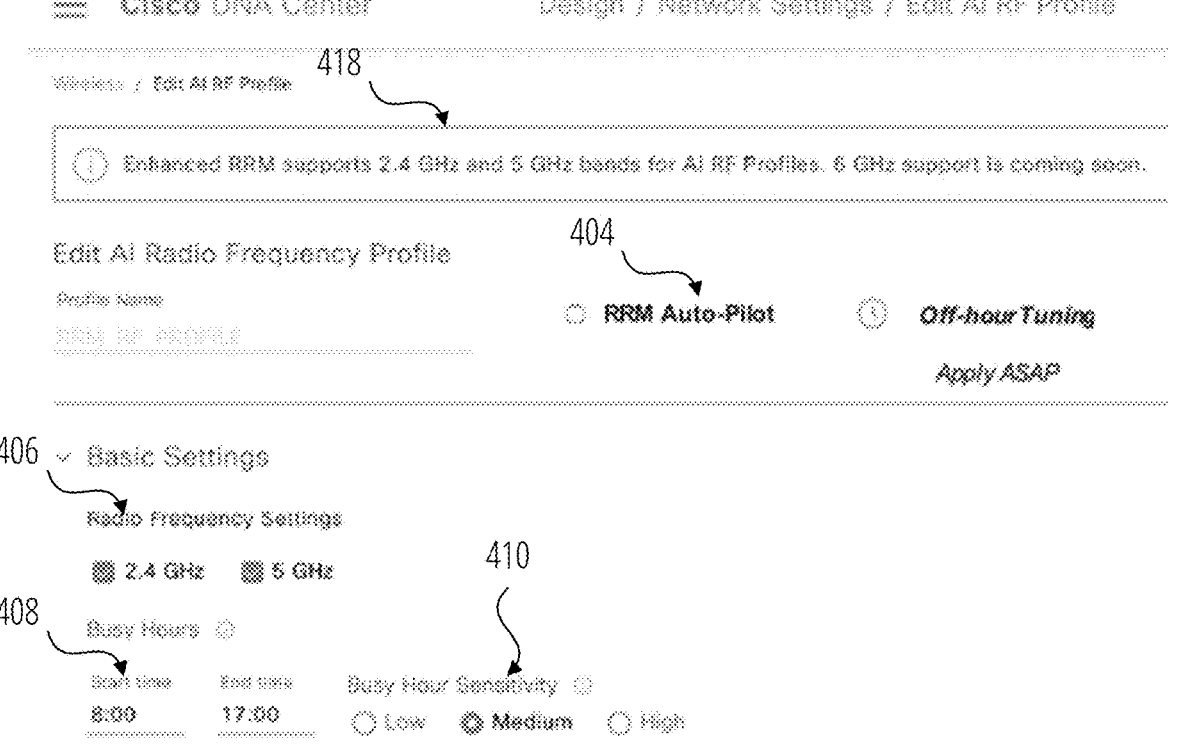
FIG. 4B illustrates an example of a window of the GUI, in accordance with some embodiments.

FIG. 4B illustrates a non-limiting example of the GUI 402, the GUI 402 is illustrated as being a window within the CISCO DNA CENTER, and it includes the auto-pilot control 404, the controls for the RF settings 406, the controls for the timing settings 408, and the controls for the tolerance settings 410.

Figure 4C:
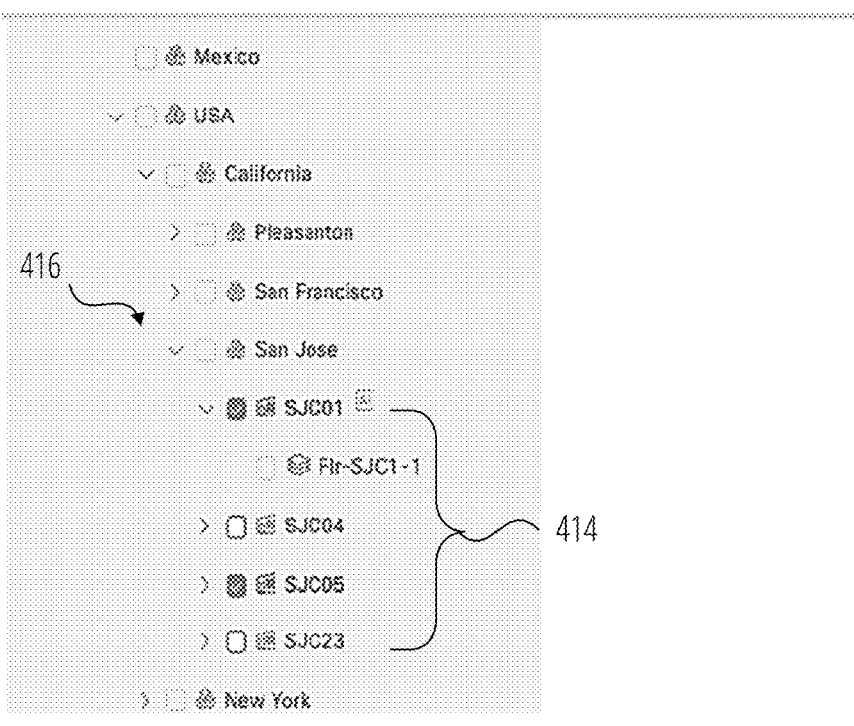
FIG. 4C illustrates another example of a window of the GUI, in accordance with some embodiments.

FIG. 4C illustrates a non-limiting example of pop-up window of the GUI 402 displaying the controls for the zone settings 414 and the controls for the region settings 416.

Figure 4D:
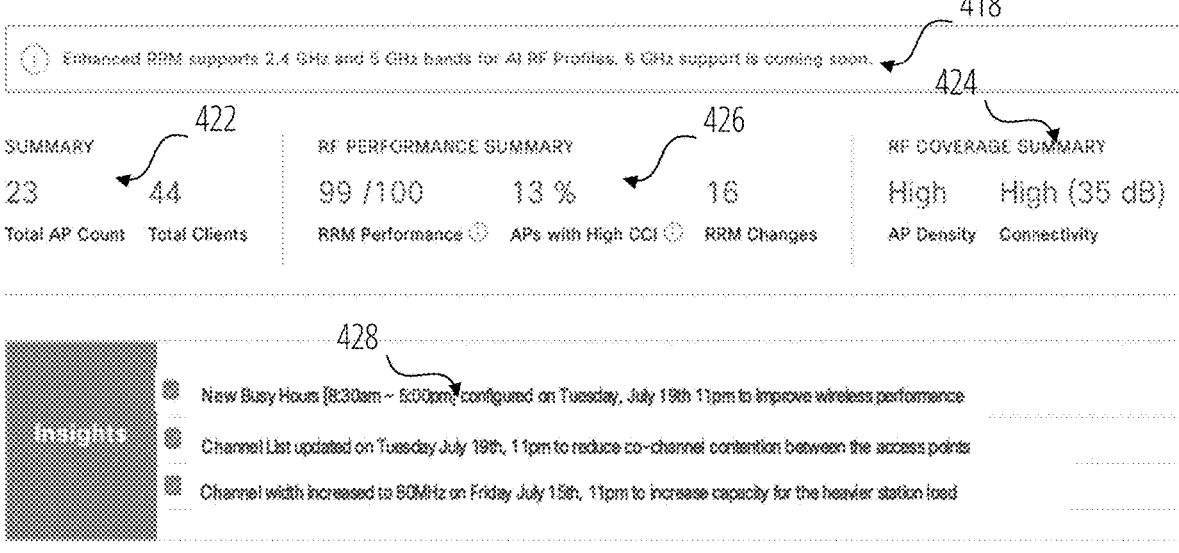
FIG. 4D illustrates a third an example of a window of the GUI, in accordance with some embodiments.

FIG. 4D illustrates a non-limiting example of pop-up window of the GUI 402 displaying the reporting windows 420. The reporting window 420 is shown including the help window 418, the count summary 422, the coverage summary 424, RF summary 426, and change summary 428.

Figure 4E:
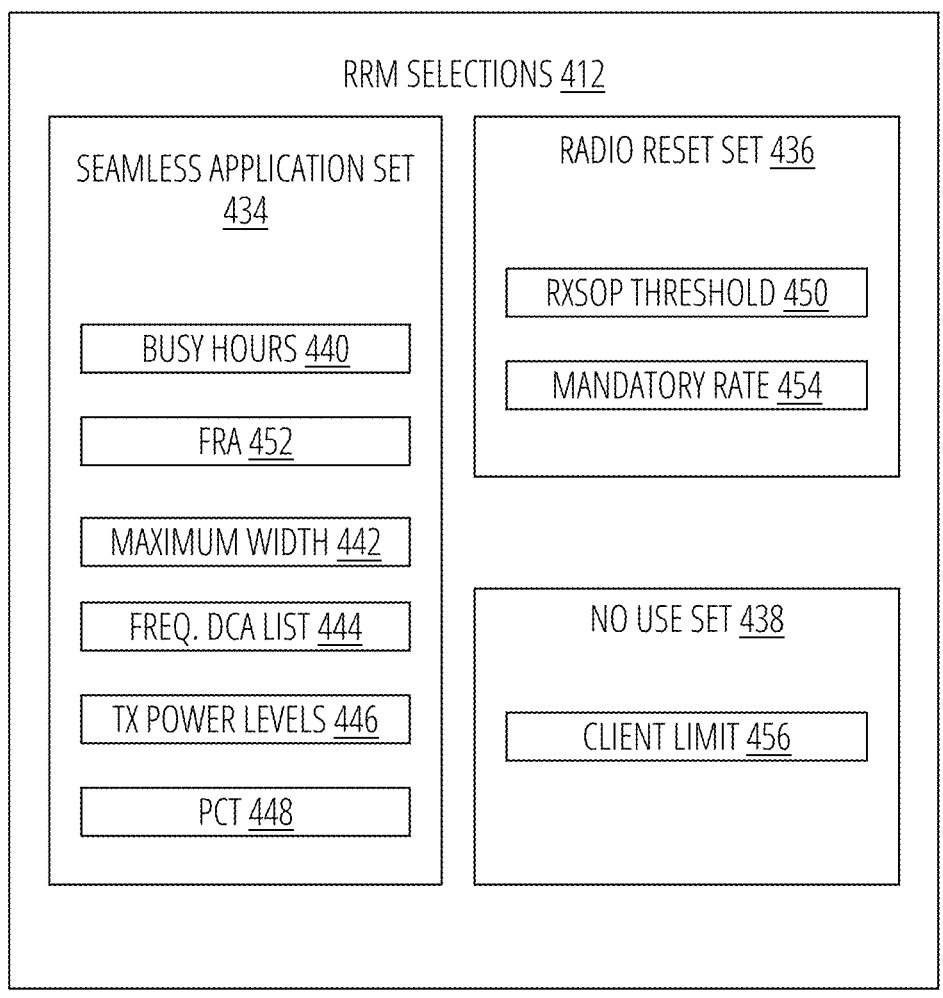
FIG. 4E illustrates a block diagram for a radio resource management (RRM) selection panel of the GUI, in accordance with some embodiments.

FIG. 4E illustrates a non-limiting example of pop-up window of the GUI 402 displaying the RRM selections 412. The RRM selections 412 allows the RRM processes/algorithms to be organized/categorized into respective sets (or subsets) and to associate the respective sets of RRM algorithms with various settings that control when and how the auto pilot automatically applies the configuration recommendations.

For example, the seamless application set 434 includes the RRM parameters (i) FRA 452, (ii) maximum width 442 (also referred to as the maximum channel width), (iii) freq. DCA list 444 (also referred to as the frequencies in the dynamic channel assignment (DCA) list), (iv) Tx power levels 446 (also referred to as the transmission power minimum/maximum levels), and (v) PCT 448, which are related to the following RRM algorithms (discussed below with reference to FIG. 6): flexible radio assignment 614, transmit power control 610, and the dynamic channel assignment 608. The seamless application set 434 associates the above-noted RRM parameters with being compatible with being performed during busy hours 440. The RRM parameters in the seamless application set 434 can be reconfigured in the system network 100 while it is operating without significant (or any) risk of disrupting wireless service.

In the non-limiting example illustrated in FIG. 4E, the radio reset set 436 includes the RRM parameters RxSOP Threshold 450 (also referred to as receiver start of packet detection threshold) and the mandatory rate 454. The radio reset set 436 are preferably reconfigured only during off-hour periods because reconfiguring these RRM parameters can require a radio reset. The radio reset set 436 might, nevertheless, be reconfigured during a busy-hour period, if the network-health measure shows a significant decrease in network performance and if policy settings allowed the radio reset set 436 to be reconfigured "as soon as possible" (ASAP) or when the network-health measure shows a significant decrease in network performance. For example, FIG. 4B shows a control for toggling between "Off-hour Tuning" and "Apply ASAP," which enables a user to change the configuration policies to allow the radio reset set 436 to be reconfigured/tuned outside of the off-hours periods. Further, FIG. 4B includes tolerance settings 410 that allow a user to adjust tolerances for how sensitive the clients are to tuning/reconfigurations during busy hours. By changing the values for the tolerance settings 410 the configuration policies can be set to more or less aggressively apply the configuration recommendations during the period set for the busy hours 440. For example, the threshold for the network-health measure can be adjusted up or down based on user tolerances.

The no use set 438 can include RRM parameters that are not to be reconfigured using the auto pilot, but that could be reconfigured if done so manual, for example. Further, the no use set 438 can include conditions under which none of the configuration recommendations will be applied until the conditions cease or are satisfied, depending on whether the conditions are framed as negative or affirmative conditions. For example, in FIG. 4E, when the client limit 456 is exceeded, no configuration recommendations are to be applied within a specified zone. However, once the number of clients in said zone is less than the client limit 456 for a predetermined length of time, the condition ceases that was preventing the configuration recommendations from being applied.

This concept is further illustrated by considering the case of an auditorium of conference room in which no network disruptions will be tolerated during a conference. Then, once the conference concludes, the system returns to the normal state of operation, and the configuration recommendations can be applied by the auto pilot. In this case, the no use set 438 can be used for the conference to avoid network disruptions based on a condition preventing changes a certain period of time or based on a client-number limit.

FIG. 5 illustrates a non-limiting example of a method 500 for applying user inputs to an auto pilot for the functioning of the AI-RRM system.

In block 502 of method 500, various inputs are received from a user. These user inputs can be received, e.g., through the GUI 402, and the user inputs can include, e.g., (i) an auto-pilot mode; (ii) zone settings; (iii) timing settings; (iv) configuration settings; and (v) RF settings.

In block 504 of method 500, configuration policies are set based on the received user inputs.

For example, for user inputs related to the auto-pilot modes, the auto-pilot modes can be received based on user interactions with the auto-pilot control 404 of the GUI 402. For example, the auto-pilot modes can select either an auto-pilot mode or a manual mode. The auto-pilot mode can indicate that configuration recommendations received from a radio resource management (RRM) recommendation engine are to be applied automatically to the system network 100. The manual mode can indicate that the configuration recommendations received from the RRM recommendation engine are only to be applied to the wireless network in response to a user manually applying the configuration recommendations to the wireless network.

For user inputs related to the zone settings, the zone settings can be received based on user interactions with the zone settings 414 of the GUI 402. For example, the zone settings can be used to select which zones of the wireless network are set to use the auto pilot. The auto pilot operates by automatically applying one or more configuration recommendations in the selected zones. The zones can be respective buildings within a campus of building. Alternatively or additionally, the zones can be respective floors within a building. Alternatively or additionally, the zones can be spaces within a building that share a common functional purpose (e.g., conference-room spaces, office spaces, or auditorium spaces). Each zone can include one or more RF groups and RF neighborhoods.

Once the zones are defined, different auto-pilot rules and configuration policies can be set for each zones or combination of zones. For example, all zones corresponding to conference rooms can have a first set of configuration policies, and all zones corresponding to office spaces can have a second set of configuration policies.

For example, the zones corresponding to office spaces can have configuration policies that include a setting to delay a first set of the configuration recommendations until an off-hours period. The first set of the configuration recommendations can be marked as possibly causing a disruption to wireless service. Further, the zones corresponding to office spaces can be marked as being sensitive to adverse effects from the disruption to wireless service that can potentially arise from applying the configuration recommendations. For example, the first set of the configuration recommendations can be defined as RRM parameters that are included in the radio reset set 436 for the zones of office spaces. In certain examples, the RRM parameters that are included in the radio reset set 436 may be different for different zones. In other examples, the RRM parameters that are included in the radio reset set 436 may be the same for all zones.

For user inputs related to the timing settings, the timing settings can be received based on user interactions with the timing settings 408 of the GUI 402. For example, the user inputs related to timing can indicate a busy-hours period. Generally, the wireless network has more clients on average during the busy-hours period than during an off-hours period. In certain examples, the RRM parameters that are included in the radio reset set 436 are not applied during the busy-hours period, but are instead applied during the off-hours period. The seamless application set 434, on the other hand, can be applied at anytime, either during either the busy-hours period or during the off-hours period.

For user inputs related to the configuration settings, the configuration settings can be received based on user interactions with the RRM selections 412 of the GUI 402. As illustrated in FIG. 4E, the RRM selections 412 can include various sets of RRM parameters.

For user inputs related to the tolerance settings, the configuration settings can be received based on user interactions with the tolerance settings 410 of the GUI 402. The tolerance settings 410 can indicate a tolerance for disruptions to the wireless network. The system can also receive a network-health measure representing a degree to which performance of the wireless network is good or has degraded.

The tolerance settings can be illustrated by a non-limiting example. On one hand, when the tolerance settings indicates a high tolerance for the disruptions, a more aggressive approach will be adopted for the configuration recommendations of the radio reset set 436 to be automatically applied to the system network 100. For example, the configuration recommendations of the radio reset set 436 to be automatically applied to the system network even during the busy-hours periods, if the network-health measure falls below a first predefined health threshold.

On the other hand, when the tolerance settings indicates a low tolerance for the disruptions, a less aggressive approach will be adopted for automatically applying the configuration recommendations to the system network 100. For example, the wireless network might be reconfigured during busy-hours periods only when the network-health measure is less than a lower, second predefined health threshold. That is the second predefined health threshold is less than the first predefined health threshold, resulting in changes to the network during busy hours only when the network health has become very poor.

As long as the network-health measure remains greater than the first predefined health threshold, the RRM parameters of the radio reset set 436 will not be applied during busy-hours periods, instead waiting until for an off-hours period to reconfigure the wireless network based on the RRM parameters of the radio reset set 436.

For user inputs related to the RF settings, the RF settings can be received based on user interactions with the RF settings 406 of the GUI 402. For example, the RF settings can indicate to which frequency bands (e.g., 2.4 GHZ, 5 GHZ, and 6 GHZ) the auto pilot is automatically applied. Further, the user inputs in the GUI 402 can selectively indicate radio frequencies (RF) settings of the wireless network (e.g., a number of available RF channels) for which one or more configuration recommendations are automatically applied.

In block 504 of method 500, configuration policies are set based on the received user inputs.

For example, when the user inputs include the auto-pilot control 404, the configuration policies are set to indicate whether one or more of the configuration recommendations will be applied automatically to the wireless network, and the configuration policies including timing information representing one or more times during which the one or more configuration recommendations will be applied automatically to the wireless network.

Further, when the user inputs include the timing settings 408, the configuration policies are set to include timing information representing one or more times during which the one or more configuration recommendations will (or will not) be applied automatically to the wireless network. For example, the timing settings 408 can indicate a busy-hours period, as illustrated in FIG. 4B. The wireless network serves more clients on average during the busy-hours period than during an off-hours period, and the off-hours period is a time window that excludes the busy-hours period.

Further, when the user inputs include the tolerance settings 410, the configuration policies are set to indicate the user's tolerance (or sensitivity) to changing the configuration of the system network 100 (or the wireless network 200) during the period defined as busy hours 440, as illustrated in the example in FIG. 4B. The configuration policies can also include one or more predefined health threshold that are set in accordance with the user defined tolerance settings 410. The health thresholds can be compared to network-health measure representing a current state of performance of the network, which comparison forms a determination regarding whether to apply configuration recommendations sooner or wait until an off-hours period.

Additionally, when the user inputs include the zone settings 414, the configuration policies are set to select which of the zones of the wireless network will automatically apply the configuration recommendations. For example, the zone settings 414 can select that, in a first zone, the application of the configuration recommendations for the radio reset set 436 are delayed until an off-hours period.

As a further example, when the user inputs include the RF settings 406, configuration policies are set to select which RF channels are to be used for the auto pilot, according to the example illustrated in FIG. 4B. For example, the RF settings 406 can selectively indicate RF settings of the wireless network for which the one or more configuration recommendations are automatically applied.

Additionally, when the user inputs include the RRM selections 412, the configuration policies are set to place the RRM parameters/algorithms into respective sets, such as the seamless application sets 434, the radio reset set 436, and the no use set 438. The seamless application sets 434 can includes those RRM parameters/algorithms that can be applied to the system network 100 without disrupting wireless service, whereas the radio reset set 436 includes those RRM parameters/algorithms from the configuration recommendations that can require a radio reset upon their being applied to the system network 100.

In block 506 of method 500, the configuration recommendations are received from the AI Core 108 (also referred to as an RRM recommendation engine). The received configuration recommendations are then applied to the wireless network in accordance with configuration policies. For example, when the auto-pilot mode is active, the one or more of the configuration recommendations are applied automatically to the wireless network. Further, in accordance with the timing information in the configuration policies, the one or more of the configuration recommendations are applied automatically during the off-hours period or sooner if dictated by one or more of the tolerance settings 410, RRM selections 412, or zone settings 414. The effect of the respective settings on which configuration recommendations are automatically applied, in which zones, and when they are automatically applied have been discussed above, and therefore are not repeated here.

In block 510, method 500 generates a report based on the configuration recommendations. The report can provide a total number of the configuration recommendations generated over a predefined time window and a summary of benefits to the wireless network arising from periodically updating the wireless network using the configuration recommendations. This report can be communicated visually (e.g., using plots or performance with respect to time), textually (e.g., describing in text the improvements arising from the configuration recommendations), or both.

In block 512, method 500 controls a display to display a graphical user interface (GIU). For example, the GUI 402 can include an input portion into which the user inputs are entered via user interactions with the GUI 402. The user inputs can be initiated as default values. The GUI 402 can include a reporting window 420 in which the report is displayed showing a difference in performance of the wireless network with the configuration recommendations relative to a performance of the wireless network without the configuration recommendations.

Figure 2:
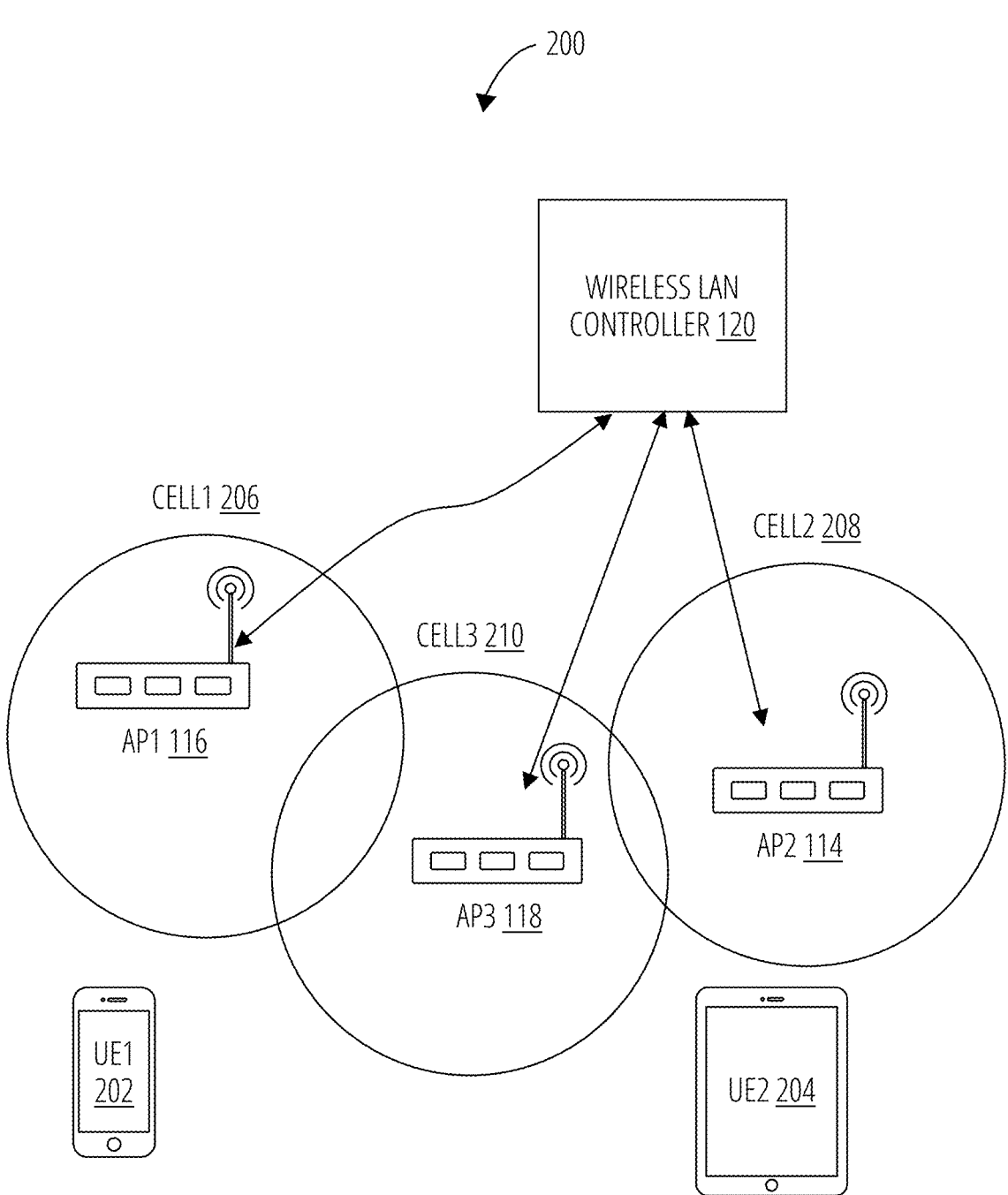
FIG. 2 illustrates a schematic diagram for an example of a wireless network of the system network, in accordance with some embodiments.

RRM includes several algorithms, which together provide management of the wireless network 200. FIG. 6 illustrates a computing device 602 that performs various RRM steps/methods. Device 602 can be a performed using distributed computing. Some or all of the functions of device 602 can be performed by the WLCs, and some or all may be performed by the network controller 106 and/or the AI Core 108. In some embodiments, the device 602 can be an embodiment of the AI Core 108, illustrated in FIG. 2. In some embodiments, the functions attributed to device 602 might reside across the AI Core 108, network controller 106, and other devices illustrated in wireless network 200. The device 602 includes a processor 204 that performs the steps of the respective methods when executing the respective methods stored in the memory 606. The methods stored in the memory 606 can include, for example: (i) RF Grouping 616 (e.g., an algorithm responsible for determining the RF Group Leader and members); (ii) Flexible Radio Assignment (FRA) 614 (e.g., an algorithm charged with identifying redundant radios resources and re-assigning the resource to a better role); (iii) Dynamic Channel Assignment (DCA) 608 (e.g., a global algorithm that runs on the RF Group leader); (iv) Transmit Power Control (TPC) 210 (e.g., a global algorithm that runs on the RF Group Leader; and (v) Coverage Hole Detection and Mitigation (CHDM) 212 (e.g., a local algorithm that runs on each individual controller). The respective methods help to maintain optimal performance by optimally applying resources to balance various countervailing interest.

For example, increasing the transmit power in a cell (e.g., cell1 206 of an AP1 116) might help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of available spectrum, the management traffic also increases, which also takes up a part of the channel capacity. The result is higher consumption of air time and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages including several features which manage specific traffic types or client types which can greatly increase the spectral efficiency and assist RRM in providing a better experience for users. The RRM can be organized according to a hierarchy with an RF Group Name at the top level, then RF Group leader(s) at the next level, which are then followed by RF Neighborhood(s) at the lower level, For any RF Group Name, multiple RF group Leaders may exist (e.g., one or more RF group Leaders frequencies in the 2.4 GHz band and one or more RF group Leaders frequencies in the 5 GHz band). An RF Group Leader can manage multiple RF Neighborhoods.

As used herein, the term "signal" refers to RF emanating from APs belonging to the same RF group or our APs. The term "interference" refers to signals (e.g., Wi-Fi signals) that interfere with a desired signal, such as signals do not belong to other networks (rogues). The term "noise" refers to any signal that cannot be demodulated according to the protocol of the wireless network 200 (e.g., any signal that is not an 802.11 signal). For example, noise can be from a non-802.11 source (such as a microwave or Bluetooth device) or from an 802.11 source whose signal is below sensitivity threshold of the receiver or has been corrupted due to collision or interference. The term "dBm" refers to an absolute, logarithmic mathematical representation of the strength of an RF signal (e.g., dBm directly correlates to milliwatts, but may also be used to represent output powers in the very low values common in wireless networking). The term "RSSI" or "Received Signal Strength Indicator" refers to an absolute, numeric measurement of the strength of the signal in a channel. The term "Noise floor" refers to the ambient RF Noise level (e.g., an absolute value expressed in dBm) below which received signals are unintelligible. The term "SNR" refers to a ratio of signal strength to noise floor, which is a relative value and as such is measured in decibels (dB). The term "RF Group" refers to the logical container that an instance of RRM is configured through. All devices belonging to a single RF Network will be configured as a member of a particular RF group. The term "RF Group leader" refers to the device where the algorithms for the RF group will be run. The RF group leader is either automatically selected through an election process or may be manually assigned through configuration. The term "RF Neighborhood" refers to a group of APs that belonging to the same RF group. For example, the RF Neighborhood can be a group of APs that can hear each other at ≥−80 dBm. This is a physical grouping based on RF proximity. The term "TPC" or "Transmit Power Control" refers to the RRM algorithm that monitors and manages transmit power level for all APs in the RF group. The term "DCA" or "Dynamic Channel Assignment" refers to the RRM algorithm responsible for selecting the operating channel for all APs in the RF group. The term "CHDM" or "Coverage Hole Detection and Mitigation" refers to the Coverage Hole Detection (CHD) algorithm and the Coverage Hole Mitigation (CHM) algorithm. The term "CM" or "Cost Metric" refers to an RSSI based metric which combines AP load, co-channel interference, adjacent channel interference, and non WiFi sourced interference into a goodness metric, which can be used by the DCA method 608 to evaluate effective channel throughput potential. The term "COF" or "Coverage Overlap Factor" refers to an output of FRA algorithm. For example, the COF can represent a percentage of cells covered to −67 dBm by other 2.4 GHz radios. The term "FRA" or "Flexible radio Assignment" refers to an RRM algorithm that manages flexible radios and determines coverage redundancy and best roles for Flexible Radios to play based on coverage requirements and density.

The RF grouping 616 method is used as the basis for the administrative management domain and the physical management domain within the RF Network. Regarding the administrative domain, proper function of the RRM is based on knowing which APs and controllers are under administrative control for each part of the network. For example, the RF Group name can be an ascii string that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (i.e., a group of APs that belong to the same RF Group that can physically hear one another's neighbor messages above −80 dBm, for example). Each RF Group has at least one RF Group Leader per band. The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel every 60 seconds or less. The NDP packet is a special broadcast message that APs all listen for and it allows us to understand how every radio on every channel hears every other radio. It also gives us the actual RF path loss between APs. When an AP hears an NDP message, the AP validates whether the message is from a member of its RF Group. If the NDP message is valid. The AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post processing of this information can be used to generate measurements for RX Neighbors (e.g., how the given AP hears other APs) and TX Neighbors (e.g., how other APs hear the given AP).

Regarding the flexible radio assignment 614 method, the FRA uses the outputs from the Neighbor Discovery Protocol to locate each radio in RF distance and evaluate overlapping coverage by cell. Now, the flexible radio assignment 614 method is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the APs coverage intersections. Based on this understanding, FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 614 keeps track of radios that are coverage contributors to other radios COF, and the FRA method 614 prevents those radios to be marked redundant as long as a radio they are a contributor for is marked redundant.

Once a Radio is marked redundant, the next step depends on the radio configuration. For example there can be two (or more) operational states to which the flexible radio can be assigned: (i) FRA-auto or (ii) manual. When the radios in the "FRA Auto" state, FRA looks to DCA to decide what to do with the now redundant radio(s). DCA's priorities are, first, to try to assign the redundant radio in 5 GHZ and increase capacity, but, if the DCA determines that there is already maximum 5 GHz coverage, the radio will be assigned to a monitor role instead.

Regarding the dynamic channel assignments 608 method, the DCA monitors the available channels for the RF group and tracks the changing conditions. The DCA then optimize the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group, and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non RF Group APs operating on or overlapping with the AP's served channel); (iii) noise (e.g., sources of interference such as Bluetooth, analog video, or cordless phones); (iv) channel load (e.g., through the use of industry standard QBSS measurements—these metrics are gathered from the Phy layer—very similar to CAC load measurements); and (v) DCA sensitivity (e.g., a sensitivity threshold selectable by the user that applies hysteresis to the evaluation on channel changes). The impact of each of these factors can be combined to form a single RSSI based metric known as the Cost Metric (CM). The CM then represents complex signal to noise and interference ration (SNIR) of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the required coverage level indicated by the TPC Threshold. TPC runs on the RF Group leader and is a global algorithm that can be sub configured in RF profiles for groups of APs in an AP group.

Regarding the coverage hole detection and mitigation 612 method, the method can be used to achieve the following objectives: (i) detecting coverage holes, (ii) validating the coverage holes, and (iii) mitigating the coverage holes. That is, CHDM first detects coverage holes and then mitigates them (if possible without creating other problems) by increasing the transmit power and therefore cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring all associated APs and thus monitoring every attached client and their received signal levels. Mitigation involves increasing the power on an AP, or group of APs to improve coverage levels to a certain area where client signals fall below a customer selectable threshold.

According to certain non-limiting examples, coverage hole detection can be based on a 5 second (CHD measurement period) histogram of each Clients Received RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process preformed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independent of RRM's DCA and TPC, can have a significant effect on surrounding APs and the balance of the RF in an environment. Part of the decision to mitigate is based on an evaluation of whether the mitigation could be successful. Increasing the power of a given AP independently of the RF Group metrics is likely to negatively impacting surrounding APs. So mitigation can be applied judiciously. The combination of the new detection metrics and the power limits included in mitigation are applied to make CHDM a stable algorithm.

In addition to the above methods, the memory 606 of the device 602 can also store information for scheduling 618, assignments 620, and information for data collection 622. The data collection 622 can include several types of measurements.

With respect to data collection 622, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally or alternatively, channel scanning can be performed on a set of channels (i.e., the channel set) defined by the DCA method, which can include all of the non-overlapping channels. The channel set can be modified in accordance with user inputs, for example. Additionally a passive dwell lasting a predefined duration (e.g., 50 msec.) can be used to detect Rogues, and collect noise and interference metrics. Also, a Neighbor Discovery Protocol Transmission (TX) can be used to send the NDP message from all channels defined to be part of a monitor set.

Figure 7A:
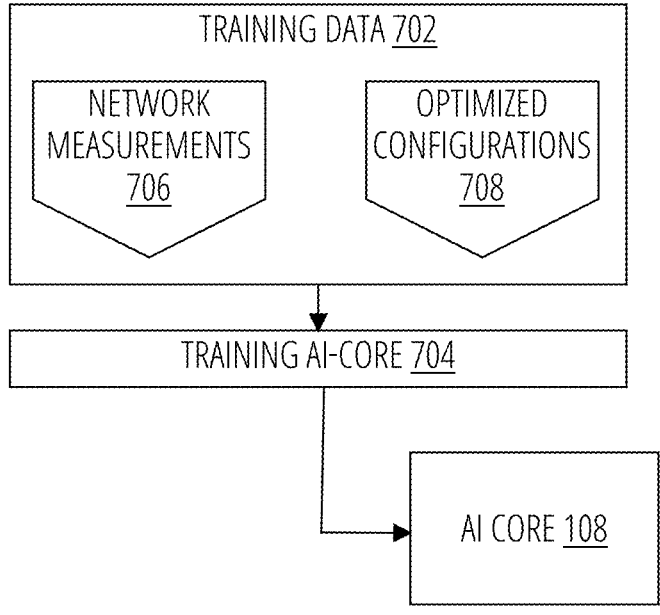
FIG. 7A illustrates a block diagram of an example of training an artificial intelligence (AI)-RRM core, in accordance with some embodiments.

FIG. 7A illustrates an example of training the AI Core 108. In block 704, training data 702 is applied to training the AI Core 108. For example, the AI Core 108 can be an artificial neural network (ANN) that is trained via supervised learning using a backpropagation technique to train the weighting parameters between nodes within respective layers of the ANN. In supervised learning, a set of training data 702 is obtained, and the network is iteratively updated to reduce an error/loss function. The value of the error/loss function decreases as the AI Core 108 outputs configurations that increasingly approximate the optimized configurations 708. In other words, ANN infers the mapping implied by the training data, and the error/loss function produces an error value related to the mismatch between the optimized configurations 708 and the output from the AI Core 108 that is produced by applying the network measurements 706 to the AI Core 108. For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribićre update, Powell-Beale restart, and scaled conjugate gradient). Additionally, evolutionary methods, such as gene expression programming, simulated annealing, expectation-maximization, non-parametric methods and particle swarm optimization, can also be used for training the AI Core 108.

The training 704 of the AI Core 108 can also include various techniques to prevent overfitting to the training data 702 and for validating the trained AI Core 108. For example, boot strapping and random sampling of the training data 702 can be used during training.

In addition to supervised learning used to initially train the AI Core 108, the AI Core 108 can be continuously trained while being used by using reinforcement learning based on the network measurements and the corresponding configurations used on the network. The AI Core 108 can be cloud based and can be trained using network measurements and the corresponding configurations from other networks that provide feedback to the cloud.

Further, other machine learning (ML) algorithms can be used for the AI Core 108, and the AI Core 108 is not limited to being an ANN. For example, there are many machine-learning models, and the AI Core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 7B:
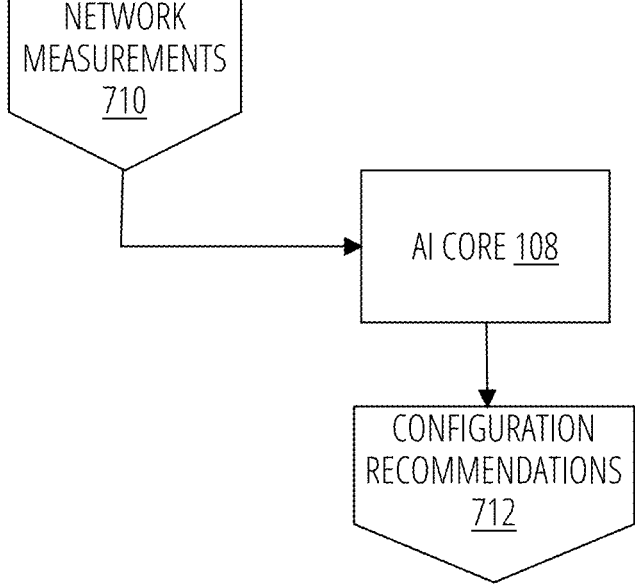
FIG. 7B illustrates a block diagram of an example of using the AI-RRM core, in accordance with some embodiments.

FIG. 7B illustrates an example of using the trained AI Core 108. The actual network measurements are applied to the trained AI Core 108, which then generates configuration recommendations 712. The configuration recommendations will then be provided to a network controller 106, which selectively applies the configuration recommendations in accordance with settings therein. For example, the configuration recommendations can be applied at predefined times for certain portions of the wireless network 200. For example, certain configuration recommendations might only be applied when there is a radio reset. Other configuration recommendations might be applied only when there is minimal risk of disrupting service during business hours. Further, different regions within the wireless network 200 might be scheduled differently.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards.

Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of applying configuration recommendations to a wireless network, the method comprising:
   receiving a first-user input selecting between an auto-pilot mode and a manual mode, the auto-pilot mode indicating that configuration recommendations received from radio resource management (RRM) recommendation engine are to be applied automatically to a wireless network, and the manual mode indicating that the configuration recommendations received from the RRM recommendation engine are to be applied to the wireless network in response to a user manually applying the configuration recommendations to the wireless network;
   setting configuration policies based on the received first-user input, the configuration policies including indications whether one or more of the configuration recommendations will be applied automatically to the wireless network applied, and the configuration policies including timing information representing one or more times during which the one or more configuration recommendations will be applied automatically to the wireless network;
   receiving the configuration recommendations from the RRM recommendation engine; and
   applying the configuration recommendations to the wireless network in accordance with the configuration policies, such that, when the auto-pilot mode is selected, the one or more of the configuration recommendations are applied automatically to the wireless network during the one or more times set in the configuration policies.

2. The method of claim 1, further comprising
   receiving a second-user input selectively indicating in which zones of the wireless network the one or more configuration recommendations are to be automatically applied.

3. The method of claim 2, wherein the second-user input comprises a setting that, in a first zone of the zones, delays automatically applying a first set of the configuration recommendations until an off-hours period, which is set in the timing information, wherein the first set of the configuration recommendations are marked as corresponding to a risk of a disruption to wireless service.

4. The method of claim 2, wherein the second-user input comprises a setting that, in a first zone of the zones, delays automatically applying a first set of the configuration recommendations until a number of clients using a wireless service in the first zone is less than a predefined client-number threshold.

5. The method of claim 2, wherein the zones comprise respective buildings within a campus of buildings, one or more floors within the respective buildings, or spaces within the respective building sharing a common functional purpose.

6. The method of claim 5, wherein, when the zones are the spaces sharing the common functional purpose, the spaces are conference-room spaces, office spaces, or auditorium spaces.

7. The method of claim 1, further comprising:
   receiving a second-user input indicating a busy-hours period, wherein the wireless network serves more clients on average during the busy-hours period than during an off-hours period, and the off-hours period is a time window that excludes the busy-hours period;
   receiving a third user input selecting a first set and a second set of the configuration recommendations, wherein the first set of the configuration recommendations are RRM recommendations that when applied to the wireless network correspond to negligible risk of disrupting wireless service, and the second set of the configuration recommendations are RRM recommendations that upon being applied require a radio reset;
   applying the first set of the configuration recommendations during either the busy-hours period or during the off-hours period; and
   applying the second set of the configuration recommendations only during the off-hours period.

8. The method of claim 1, wherein
   receiving a second-user input indicating a tolerance for disruptions to the wireless network;
   receiving a network-health measure representing a degree to which performance of the wireless network has degraded;
   when the second-user input indicates a first tolerance for the disruptions, automatically applying the one or more configuration recommendations to the wireless network upon the network-health measure being less than a first predefined health threshold;
   when the second—user input indicates a second tolerance—which is lower than the first tolerance—for the disruptions, automatically applying the one or more configuration recommendations to the wireless network upon the network-health measure being less than a second predefined health threshold, wherein the second predefined health threshold is less than the first predefined health threshold; and
   when the network-health measure remains greater than the first predefined health threshold, waiting until an off-hours period to automatically apply the one or more configuration recommendations to the wireless network.

9. The method of claim 1, further comprising
   receiving second-user inputs selecting radio frequencies (RF) settings for the wireless network, the RF settings being associated with the one or more configuration recommendations that are automatically applied;
   setting the configuration policies based on the received second-user input; and
   applying the configuration recommendations to the wireless network in accordance with configuration policies, such that, when the auto-pilot mode is selected, the one or more of the configuration recommendations are applied automatically using the RF settings.

10. The method of claim 1, further comprising:

generating a report based on the configuration recommendations, the report summarizing the configuration recommendations received from the RRM recommendation engine and the one or more configuration recommendations that have been automatically applied to the wireless network over a predefined time window, and the report including a summary of benefits to the wireless network predicted for applying the configuration recommendations, and benefits realized from the one or more configuration recommendations that have been automatically applied to the wireless network.

11. The method of claim 1, further comprising:

controlling a display to display a graphical user interface (GIU), the GUI including an input portion into which a user inputs the first-user inputs, and the GUI including a reporting portion in which a report is displayed showing a difference in performance of the wireless network with the configuration recommendations relative to a performance of the wireless network without the configuration recommendations.

12. The method of claim 11, wherein the GUI further includes a reporting portion in which a report is displayed showing a difference in performance of the wireless network with the configuration recommendations relative to a performance of the wireless network without the configuration recommendations.

13. The method of claim 12, wherein the reporting portion of the GUI further displays a report that summarizes the configuration recommendations and that describes benefits to the wireless network arising from the configuration recommendations applied to the wireless network over a predefined period.

14. A computing apparatus comprising:

a processor; and a memory storing instructions that, when executed by the processor, configure the apparatus to:

receive a first-user input selecting between an auto-pilot mode and a manual mode, the auto-pilot mode indicating that configuration recommendations received from radio resource management (RRM) recommendation engine are to be applied automatically to a wireless network, and the manual mode indicating that the configuration recommendations received from the RRM recommendation engine are to be applied to the wireless network in response to a user manually applying the configuration recommendations to the wireless network;

set configuration policies based on the received first-user input, the configuration policies including indications whether one or more of the configuration recommendations will be applied automatically to the wireless network applied, and the configuration policies including timing information representing one or more times during which the one or more configuration recommendations will be applied automatically to the wireless network;

receive the configuration recommendations from the RRM recommendation engine; and apply the configuration recommendations to the wireless network in accordance with the configuration policies, such that, when the auto-pilot mode is selected, the one or more of the configuration recommendations are applied automatically to the wireless network during the one or more times set in the configuration policies.

15. The computing apparatus of claim 14, wherein the stored instructions, when executed by the processor, further configure the apparatus to:

receive a second-user input selectively indicating in which zones of the wireless network the one or more configuration recommendations are to be automatically applied; and delay, in a first zone indicated by the second-user input, automatically applying a first set of the configuration recommendations until an off-hours period, which is set in the timing information, wherein the first set of the configuration recommendations are marked as corresponding to a risk of disrupting service within the wireless network, and the zones comprise respective buildings within a campus of buildings, one or more floors within the respective buildings, or spaces within the respective building sharing a common functional purpose.

16. The computing apparatus of claim 14, wherein the stored instructions, when executed by the processor, further configure the apparatus to:

receive a second-user input indicating a busy-hours period, wherein the wireless network serves more clients on average during the busy-hours period than during an off-hours period, and the off-hours period is a time window that excludes the busy-hours period;

receive a third user input selecting a first set and a second set of the configuration recommendations, wherein the first set of the configuration recommendations are RRM recommendations that when applied to the wireless network correspond to negligible risk of disrupting wireless service, and the second set of the configuration recommendations are RRM recommendations that upon being applied require a radio reset;

apply the first set of the configuration recommendations during either the busy-hours period or during the off-hours period; and apply the second set of the configuration recommendations only during the off-hours period.

17. The computing apparatus of claim 14, wherein the stored instructions, when executed by the processor, further configure the apparatus to:

receive a second-user input indicating a tolerance for disruptions to the wireless network;

receive a network-health measure representing a degree to which performance of the wireless network has degraded;

when the second-user input indicates a first tolerance for the disruptions, automatically apply the one or more configuration recommendations to the wireless network upon the network-health measure being less than a first predefined health threshold;

when the second-user input indicates a second tolerance—which is lower than the first tolerance—for the disruptions, automatically apply the one or more configuration recommendations to the wireless network upon the network-health measure being less than a second predefined health threshold, wherein the second predefined health threshold is less than the first predefined health threshold; and when the network-health measure remains greater than the first predefined health threshold, wait until an off-hours period to automatically apply the one or more configuration recommendations to the wireless network.

18. The computing apparatus of claim 14, wherein the stored instructions, when executed by the processor, further configure the apparatus to:

receive second-user inputs selecting radio frequencies (RF) settings for the wireless network, the RF settings being associated with the one or more configuration recommendations that are automatically applied;

set the configuration policies based on the received second-user input; and apply the configuration recommendations to the wireless network in accordance with configuration policies, such that, when the auto-pilot mode is selected, the one or more of the configuration recommendations are applied automatically using the RF settings.

19. The computing apparatus of claim 14, wherein the stored instructions, when executed by the processor, further configure the apparatus to:

control a display to display a graphical user interface (GIU), the GUI including an input portion into which a user inputs the first-user inputs, and the GUI including a reporting portion in which a report is displayed showing a difference in performance of the wireless network with the configuration recommendations relative to a performance of the wireless network without the configuration recommendations.

20. A non-transitory computer-readable storage medium, the computer-readable storage medium including instructions that when executed by a computer, cause the computer to:

receive a first-user input selecting between an auto-pilot mode and a manual mode, the auto-pilot mode indicating that configuration recommendations received from radio resource management (RRM) recommendation engine are to be applied automatically to a wireless network, and the manual mode indicating that the configuration recommendations received from the RRM recommendation engine are to be applied to the wireless network in response to a user manually applying the configuration recommendations to the wireless network;

set configuration policies based on the received first-user input, the configuration policies including indications whether one or more of the configuration recommendations will be applied automatically to the wireless network applied, and the configuration policies including timing information representing one or more times during which the one or more configuration recommendations will be applied automatically to the wireless network;

receive the configuration recommendations from the RRM recommendation engine; and apply the configuration recommendations to the wireless network in accordance with the configuration policies, such that, when the auto-pilot mode is selected, the one or more of the configuration recommendations are applied automatically to the wireless network during the one or more times set in the configuration policies.

* * * * *